US011650558B2

(12) United States Patent
Suessmilch et al.

(10) Patent No.: US 11,650,558 B2
(45) Date of Patent: May 16, 2023

(54) METHOD AND DEVICE FOR CHECKING THE INTEGRITY OF MODULES OF A WIND TURBINE

(71) Applicant: Bachmann GmbH, Feldkirch (AT)

(72) Inventors: Bernd Suessmilch, Zwischenwasser (AT); Hannes Moesl, Navis (AT)

(73) Assignee: BACHMANN GMBH, Feldkirch (AT)

(*) Notice: Subject to any disclaimer, the term of this patent is extended or adjusted under 35 U.S.C. 154(b) by 495 days.

(21) Appl. No.: 16/701,241

(22) Filed: Dec. 3, 2019

(65) Prior Publication Data

US 2020/0209818 A1 Jul. 2, 2020

(30) Foreign Application Priority Data

Dec. 27, 2018 (DE) .................. 10 2018 133 605.5

(51) Int. Cl.
*G05B 19/042* (2006.01)
*H04L 9/08* (2006.01)
*G06Q 50/06* (2012.01)

(52) U.S. Cl.
CPC ........... *G05B 19/042* (2013.01); *G06Q 50/06* (2013.01); *H04L 9/088* (2013.01); *G05B 2219/2619* (2013.01)

(58) Field of Classification Search
CPC .............. G05B 19/042; G05B 19/0428; G05B 2219/2619; G06Q 50/06; H04L 9/0643; H04L 9/0866; H04L 9/0877; H04L 9/088; Y04S 40/20

See application file for complete search history.

(56) References Cited

U.S. PATENT DOCUMENTS

| 2007/0288740 A1* | 12/2007 | Dale ..................... G06F 9/4405 713/2 |
| 2011/0078446 A1* | 3/2011 | He ......................... H04W 12/50 380/283 |
| 2015/0142191 A1* | 5/2015 | Bengtson ............... G05B 15/02 700/287 |

FOREIGN PATENT DOCUMENTS

| CN | 106685932 | 5/2017 |
| DE | 102007014782 A1 | 9/2007 |
| EP | 2418553 A2 | 2/2012 |

OTHER PUBLICATIONS

Chinese Examination Report for Patent No. 20113749020 dated Sep. 23, 2022.
German Examination Report dated May 11, 2022.

* cited by examiner

*Primary Examiner* — Yuhui R Pan
(74) *Attorney, Agent, or Firm* — Browdy and Neimark, PLLC

(57) ABSTRACT

A method and a device for checking the integrity of modules of a technical facility. The technical facility has multiple modules and sets of controls for controlling the technical facility. For starting up each set of controls and the overall technical facility, a master key is used which is utilized for decrypting an encrypted region of the set of controls. The master key for starting up a set of controls of the technical facility is derived from features of all sets of controls installed in the technical facility, and a start or a start-up of the technical facility can take place only when the master key is found to be satisfactory.

8 Claims, 3 Drawing Sheets

METHOD AND DEVICE FOR CHECKING THE INTEGRITY OF MODULES OF A WIND TURBINE

Figure 1:
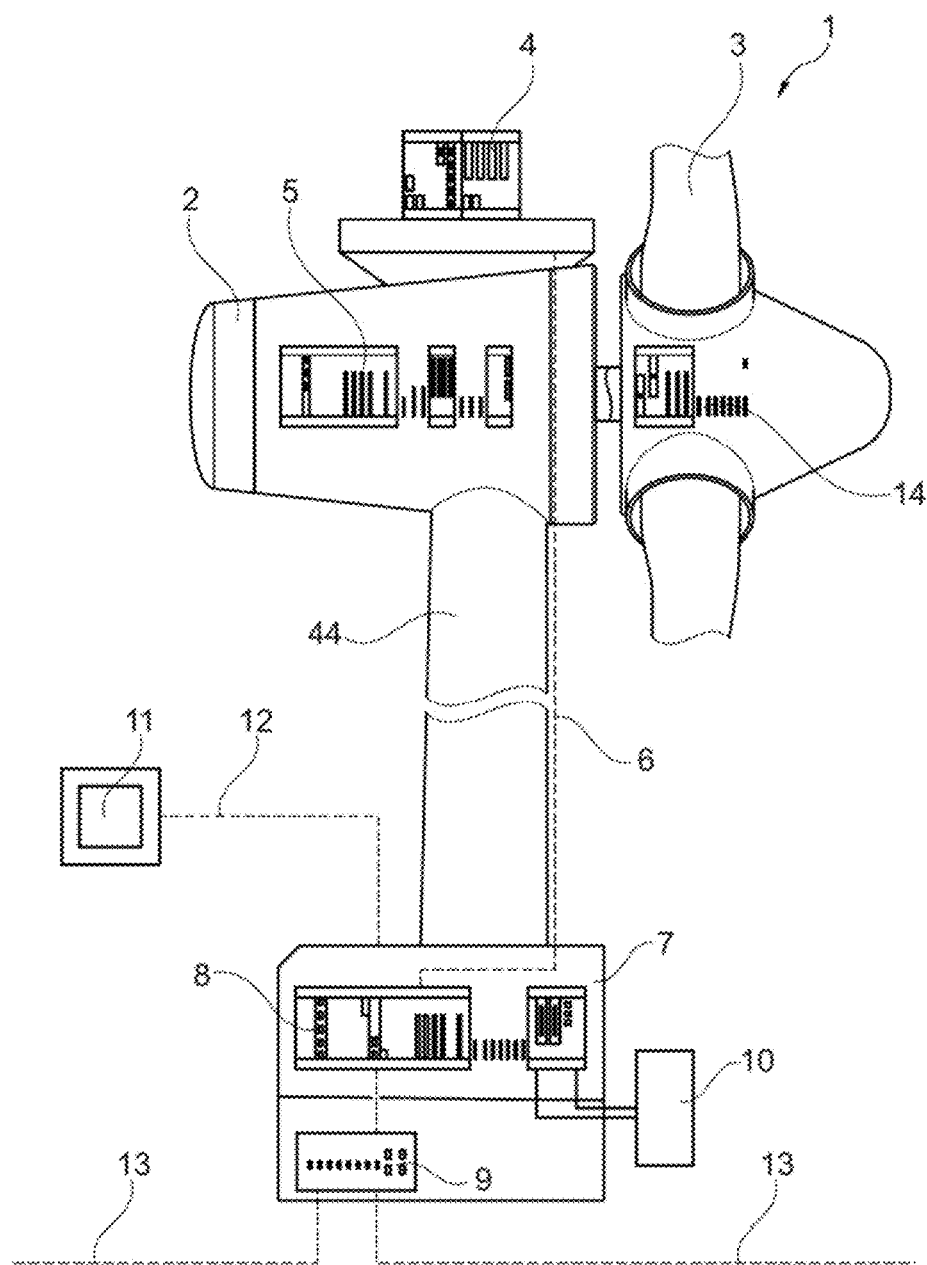

The subject matter of the invention relates to a method and a device for checking the integrity of modules of a technical facility, wherein the technical facility has multiple modules and sets of controls for controlling the technical facility, wherein for starting up each set of controls and the overall technical facility, a master key is used which is utilized for decrypting an encrypted region of the set of control.

In the following discussion, a wind turbine is described as an example of a technical facility.

Renewable energies are playing an increasingly greater role in the supplying of power. In particular, large wind farms are among the critical infrastructures whose IT security must be ensured at all times.

For the automation of a wind turbine, for example up to four sets of controls and a control terminal are used. The main controller of the wind turbine is divided, for example, into two sets of controls in the base and in the nacelle of the wind turbine. Another set of controls is situated in the pitch system, and controls the rotor blades. A further set of controls may be provided for condition monitoring. The operator interface of the facility is displayed on the control terminal (turbine OP).

Sets of controls have a secured (encrypted) region that includes the configuration parameters and the runtime environment. This region is safeguarded with a master key.

In such highly complex wind turbines, it is problematic that modules may be removed from the group of modules without authorization, and then analyzed or possibly also altered outside the wind turbine network.

This has been possible in the past due to the fact that in wind turbine modules thus far, the master key necessary for operation of the module has been stored in the module itself. However, it is disadvantageous that when the master key is continually stored in the particular module of the wind turbine, the module may be compromised by unauthorized interventions at the module.

A master key is the central component of current security concepts based on cryptographic methods. In current systems, the master key is either entered by the user, or derived from hardware features of the controller (an internal device or devices such as a CF card or USB dangle that are directly attached to the controller) with the aid of a master key derivation function.

In the field of automation technology, input of the master key by the user as well as derivation of the master key from hardware features have the following disadvantages:

In automation technology, the master key is generally issued by the machine manufacturer. Keys derived from the master key are used to protect the intellectual property of the machine manufacturer. When the master key is directly entered, it is known to the employees of the machine manufacturer. This is a security risk when these employees leave the company.

If the master key is derived from hardware features of internal devices via a key derivation function, replacement of the controller is not possible without generating a new master key. As a result, all derived keys must likewise be re-generated, and all encrypted data must be decrypted using the old keys and re-encrypted with the new keys.

If the key derivation function is based on internal or attached devices, the controller and the device may be stolen. The stolen controller boots normally, and an attacker may analyze it unhindered.

The object of the invention, therefore, is to provide a method and a device for checking the integrity of modules of a technical facility, in particular a wind turbine, which avoid the above-mentioned disadvantages.

This object is achieved by a method and a device according to the features of the independent claims.

Preferred embodiments of the invention and further advantageous features are set forth in the subclaims.

According to one preferred exemplary embodiment of the invention, it is provided that the master key is not stored on a set of controls of the wind turbine, and therefore cannot be read out. This is particularly advantageous due to the fact that even if the set of controls is compromised or stolen, starting up the wind turbine with the altered set of controls is not possible, since the master key is derived only at runtime with the assistance of the surrounding sets of controls.

The aim of the method is to derive this master key upon start-up of a set of controls of the wind turbine via their environment, i.e., via the other sets of controls installed in the facility. Starting or starting up the technical facility is possible only when the master key is derived from the features of all sets of controls installed in the technical facility and found to be satisfactory.

The following definitions apply as prerequisites for the described method:

Set of Controls:

A set of controls is made up of a CPU module that is connected to various function modules of the facility via a bus.

Master Key:

The central key in a cryptosystem, from which other keys within the cryptosystem are derived.

Key Derivation Function:

An algorithm that generates a cryptographic key from a password or another key.

Integrity:

The integrity, as part of the CIA triad, encompasses the correctness of the data as well as the correct functional performance of a system.

Nonrepudiation:

Communication or data cannot be retrospectively repudiated with respect to third parties by one of the involved entities.

Pre-Operational State of a Set of Controls:

Preliminary operating state of a set of controls after the initial boot process, in which the key derivation process for the master key becomes active.

The following definitions and conditions apply as prerequisites for the described method:

Three or more sets of controls or control terminals are present in the wind turbine. Since it is irrelevant for the method whether sets of controls or control terminals are involved, only the term "set of controls" is used in the description below.

Each set of controls knows its environment in the form of parameters that are defined via an IP or MAC address, for example. For these parameters it must also be ensured that they cannot be tampered with by third parties.

The order in which the sets of controls in the wind turbine are put into operation must have no effect on the key derivation process.

Individual sets of controls must be able to perform a reboot, for example triggered by a watchdog, without adversely affecting the other sets of controls. This also implies that sets of controls in the normal operating state must be able to respond to the protocol.

Replacement operations must be performable without problems and without additional effort.

In the event that the master key has been compromised, it must be replaceable.

After power is supplied, each set of controls within a wind turbine starts in a so-called preliminary pre-operational state. The key derivation process is carried out in this pre-operational state.

For the key derivation, each set of controls initially determines a token based on their characteristics. The characteristics may encompass various features, for example an unambiguous component ID, position of the module on the bus, environmental conditions, etc. The set of controls in the pre-operational state then asks for so-called tokens via a request to the other sets of controls, which are part of the configured environment of the former. The other sets of controls in turn cryptographically safeguard their token via known methods and send the tokens back to the set of controls that transmitted the request. The cryptographic methods ensure that the token irrefutably originates from the controller (guarantee of nonrepudiation), and any manipulations of the token can be discovered (maintenance of integrity).

At this point in time, each set of controls has its own token and the tokens of all sets of controls in its environment. To ensure that the particular tokens also unequivocally originate from an authorized set of controls in the environment, the tokens are cryptographically checked for integrity and origin. If the test is passed, all tokens of the sets of controls in the environment are entered into a decision module, where the final master key is derived from these tokens with the aid of an algorithm. By use of this master key, the encrypted region of the set of controls is now decrypted, and the boot operation for the set of controls may be continued, and the set of controls is transferred into the normal operating state. The wind turbine can be put into operation when all sets of controls are in the operating state.

One particular advantage of the invention is that a protocol module that may be designed either as a hardware module or as a software module is present. The tokens generated by the individual sets of controls are compared to one another in the protocol module, which is part of a decision module, and a decision is made as to whether all sets of controls are provided with a valid token. Only after the tokens are checked and confirmation is made that all tokens are present is the master key generated and used to transfer the sets of controls into their operating state. Only then can the wind turbine be put into operation.

Another preferred feature of the invention is the checking of the integrity of the individual sets of controls, which likewise are checked in the protocol module. This takes place in an upstream decision node, upstream from the key derivation, and only when the validity of the token has been confirmed in the decision node does the key derivation take place, and subsequently the decision is made concerning the validity of the derived key in a further decision node, and only then can the facility be put into operation.

The subject matter of the present invention results not only from the subject matter of the individual patent claims, but also from the combination of the individual patent claims with one another.

All information and features disclosed in the application documents, including the abstract, in particular the spatial design illustrated in the drawings, may be claimed as essential to the invention, provided that, alone or in combination, they are novel with respect to the prior art. Use of the terms "essential" or "according to the invention" or "essential to the invention" is subjective, and does not imply that the features thus designated must necessarily be a component or one or more patent claims.

The invention is explained in greater detail below with reference to drawings that illustrate only one implementation approach. In this regard, further features and advantages of the invention that are essential to the invention emerge from the drawings and their description.

In the drawings:

FIG. 1: shows a schematic block diagram of a wind turbine

Figure 2:
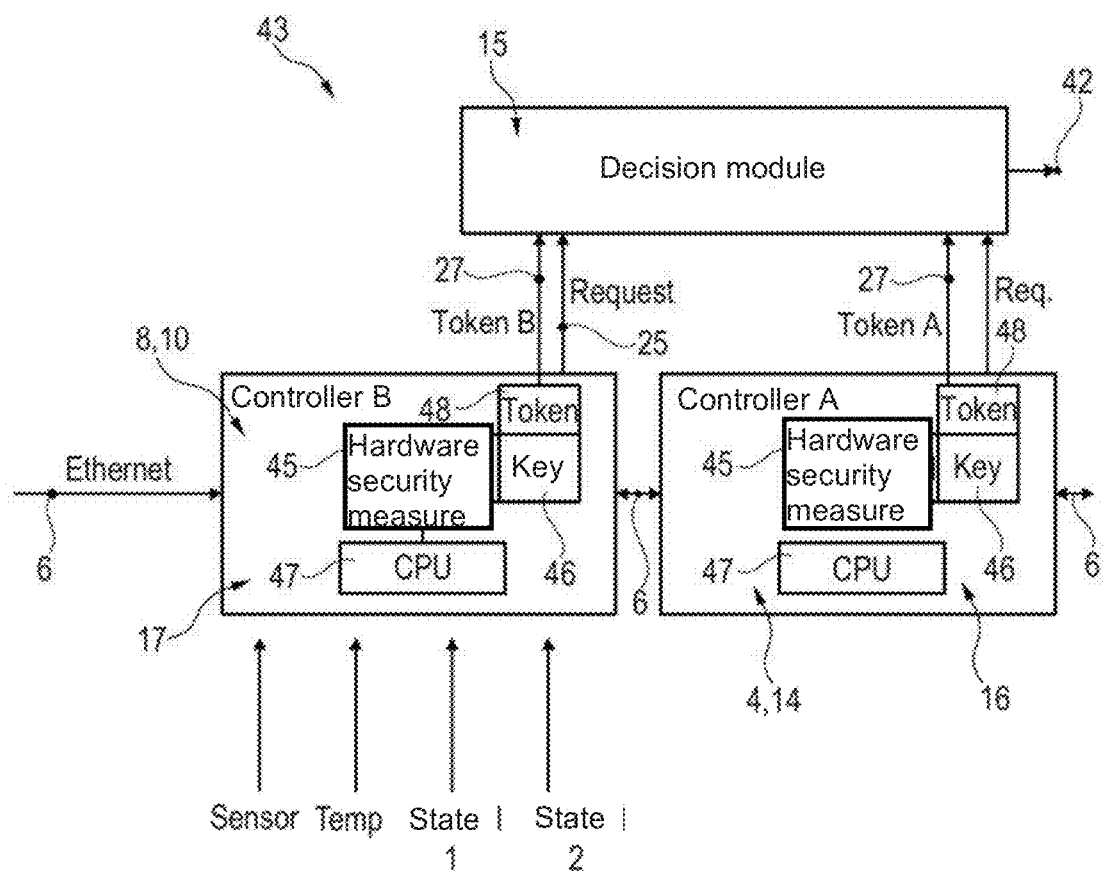

FIG. 2: shows a schematic block diagram of a decision device

Figure 3:
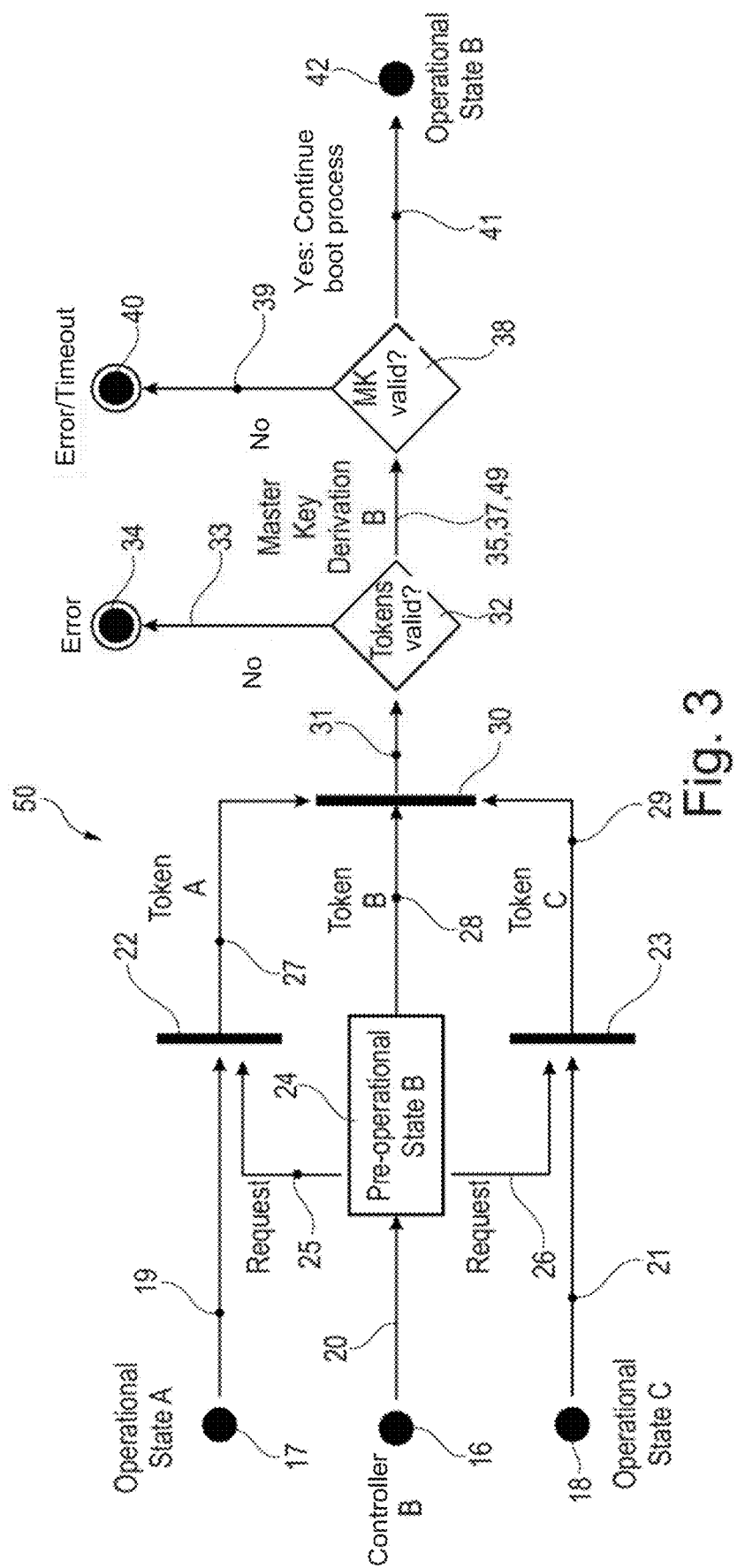

FIG. 3: shows the block diagram of a protocol module

FIG. 1 schematically illustrates a wind turbine 1 that includes a tower 44 that is anchored to the ground by means of a tower base 7. A nacelle 2 is affixed at the upper end of the tower 44, in the interior of which a generator, which is connected to a rotor 3 via a drive shaft, is present.

A higher-order monitoring controller 4, which is referred to below in general as the set of controls A or set of controls B or set of controls C, is situated in the nacelle 2.

Also present in the nacelle 2 is a converter 5 that includes a control module, which likewise is referred to below in general as the set of controls A, B, or C.

A rotor controller 14, which likewise is referred to below in general as the set of controls A or set of controls B or set of controls C, is present in the area of the rotor 3.

Each of the modules 4, 5, and 14 mentioned above can take over the task of the set of controls A or set of controls B or set of controls C described below.

An Ethernet connection 6 or some other suitable bus connection leads from the nacelle 2 via the tower 44 to the tower base 7, where a number of further modules are present, and a main controller 8 is also installed.

The main controller 8 is in functional connection with a terminal 11, for example, which includes a display device and an input device and user inputs, for example, this terminal 11 being connected via a signal connection 12 in the main controller 8.

Even further modules may also be present; a monitoring module 10 and a network changeover switch 9 are mentioned as examples.

The overall wind turbine 1 is connected via the main controller 8 to a high-speed communication bus 13, via which the wind turbine is connected to other wind turbines and can communicate with them.

FIG. 2 shows a functional block diagram of the electrical connection between a set of controls A 16 and a set of controls B 17, the set of controls A 16 being in communication connection with the set of controls B 17 via the above-mentioned Ethernet connection 6.

The set of controls B 17 includes a CPU 47 for processing data, which are supplied to the set of controls B 17 via the Ethernet connection 6 and/or multiple signal inputs, wherein a sensor input, a temperature input, a status input 1, and a status input 2, for example, may be provided. The set of controls B 17 may have a number of further signal inputs.

The CPU 47 controls a hardware security module 45, which generates an internal key 46 from which a token 48 is generated under the influence of the CPU 47. This token 48 is supplied via a logical path 27 to a decision module 15, in which a decision is made concerning the validity of the token 48, and lastly, a master key 49 that is valid for all combined modules is also generated.

The sets of controls 16, 17 illustrated in FIG. 2 as well as the set of controls C 18 schematically illustrated in FIG. 3 may have identical designs, or at least have the above-described components, wherein identical parts are provided with the same reference numerals.

Thus, the set of controls A 16 also generates a token 48, which is supplied to the decision module 15 via the logical path 27. The same applies for the set of controls C 18 (see FIG. 3).

It is preferred that the set of controls B, which is in the pre-operational state and still must be checked, is generated from a request (request 25) in order to prompt the decision module 15 to check its transmitted token B against the other tokens A, C of the other sets of controls A, C, which are brought together in the decision module 15.

The functioning of a decision module 15 is illustrated in FIG. 3. It is preferred that the protocol module 50 illustrated in FIG. 3 is integrated into the decision module 15.

FIG. 3 shows the components for deriving a master key from the tokens A, B, C generated from the sets of controls A, B, C.

It is assumed that the set of controls B 16 has been newly installed in the wind turbine, or that changes have been made to the set of controls B 16.

Accordingly, when the set of controls B 16 is booted, the procedure described below is carried out.

For simplification, it is assumed that the set of controls A 17 and the set of controls C 18 are already in the normal operating state. The set of controls B 16 is started and runs through the method for deriving a master key.

After start-up, the set of controls B 16 switches into a pre-operational state and requests the respective token 19, 21 from the sets of controls A 17 and C 18. The sets of controls A 17 and C 18 transmit their respective token 19, 21 to a merge node 22, 23. The validity of the tokens 19, 21 is checked by the set of controls A. If the tokens are valid, the master key is derived. If the master key is also valid, the set of controls B switches into the normal operating state.

The two other sets of controls 17 and 18 generate a valid token, which is supplied to an associated merge node 22, 23 of the protocol module via the logical paths 19 and 21.

It is assumed that the set of controls 16 is not yet operative, and its integrity must therefore be checked. A master key that is stored in the set of controls is not necessary for this purpose. Rather, according to the invention a token that is generated by the set of controls 16 and supplied to a function status module 24 via the logical path 20 is sufficient. The function status module 24 generates a pre-operational state of the set of controls B 16, which indicates that the integrity of the set of controls B 16 has not yet been checked, and therefore the overall wind turbine must not yet be put into operation.

In this pre-operational state of the set of controls B 16, starting from the function status module 24, a request is sent to the two merge nodes 22 and 23 via the logical paths 25 and 26 to evaluate whether the tokens on the logical paths 19 and 21 as well as the token on the path 20, or the paths 25, 26, are valid.

Accordingly, in a first decision step in the merge nodes 22 and 23, a validity check of the individual tokens 19, 20, 21 from the individual sets of controls 17, 16, 18 takes place, wherein the set of controls B 16 is still in the preoperational state until the validity of the token 20 has been checked.

If the result of the comparison of the tokens in the merge node 22 and 23 is satisfactory, a further merge node 30 is controlled via the logical paths 27, 28, 29.

It is preferred that the set of controls 16 to be checked, which is in the pre-operational state, makes a request 25, 26 to the merge node 22, 23, which is used to prompt, via the merge nodes 22, 23, the respective set of controls 17 and 18 to send their token from the merge node 22, 23, in particular via the logical path 27 and 29, whereupon a total of three tokens are collected in the downstream merge node 30 via the paths 27, 28, 29, and are subsequently transmitted via the logical path 31 to the decision node 32, which then checks all three arriving tokens for validity.

If an error occurs, an end state 34 is flagged as an error via the decision output 33, and the wind turbine 1 cannot be put into operation.

However, if the decision node 32 makes a decision on the validity of the three tokens A, B, C to be checked, a key derivation 37 takes place on the downstream logical path 35, and from the key a master key 49 is now generated, which is supplied to the decision node 38.

The validity of the master key 49 is checked in the decision node 38. If an error occurs, the decision output 39 determines an error state as the end state 40, and the wind turbine 1 cannot be put into operation.

However, if a valid master key 49 is present, at the output of the decision node 38 a continuation message is then sent to the central controller on the logical path 41, and the central controller thus acknowledges the set of controls B 16 as valid. The function status module 24 places the set of controls B 16 from the pre-operational state into the normal operating state, and the wind turbine can be put into operation.

The advantage of this measure is that initially, in a first step in the area of multiple parallel merge nodes 22, 23 situated in parallel a request is made to all sets of controls to send a token, so that this token may be checked in a downstream second merge node 30.

Only when the validity of all tokens in this downstream merge node 30 has been recognized does a key derivation take place, from which a master key is then generated.

For example, a function known as the password-based key derivation function 2 (PBKDF2) may be used for the key derivation. This is a normalized function for deriving a key from a password and using the key in a symmetrical method.

When such a method is used, it is preferred to apply a pseudorandom function, such as a cryptological hash function or an HMAC, together with a salt value, to the password. The function is subsequently applied multiple times to the result. This linkage makes it difficult to deduce the original password from the key, using the brute force method. In addition, the use of rainbow tables is greatly impeded due to utilizing salt. By increasing the number of passes, the function may also be adapted to the increasing power of computers.

The PBKDF2 method is only one example of such a key derivation 37 for generating a master key 49. However, there are other preferred methods that are suitable for deriving a key from a password and using the key in a symmetrical method.

In particular, the invention is not dependent on the use of a hardware security module 45 for generating a key 46.

There are also other methods that use cryptographic operations, which allow the trustworthiness and integrity of data and the associated information to be ensured.

Such a described hardware security module is a very simple case, which in other embodiments may be implemented in a much more extensive and complex manner.

Hardware security modules usually provide numerous functions for secure management of the device and the keys. Examples are the authentication of operators and administrators by hardware tokens (chip cards or security tokens, for example), access protection using the four eyes principle (k out of n persons necessary), encrypted backup of the keys and configuration data, and secure cloning of the hardware security module.

In principle, the hardware security module may thus be used to cryptographically generate a token.

LIST OF REFERENCE NUMERALS 1 wind turbine
2 nacelle
3 rotor
4 monitoring controller
5 converter
6 Ethernet connection
7 tower base
8 main controller
9 changeover switch (network)
10 monitoring module
11 terminal
12 signal connection
13 communication bus
14 rotor controller
15 decision module
16 set of controls B
17 set of controls A
18 set of controls C
19 logical path (A)
20 logical path (B)
21 logical path (C)
22 merge node
23 merge node
24 function status module
25 request
26 request
27 logical path
28 logical path
29 logical path
30 merge node
31 logical path
32 decision node (token)
33 decision output
34 end state
35 logical path
36 decision node
37 key derivation
38 decision node (key)
39 decision output
40 end state
41 logical path
42 start process
43 decision device
44 tower
45 hardware security module
46 key
47 CPU
48 token
49 master key
50 protocol module

The invention claimed is:

1. A method for checking the integrity of modules of a technical facility, wherein the technical facility has multiple modules and sets of controls for controlling the technical facility, wherein for starting up each set of controls and the overall technical facility, a master key is used which is utilized for decrypting an encrypted region of the set of controls, the method comprising:
deriving the master key for starting up a set of controls of the technical facility from features of all sets of controls installed in the technical facility, and
authorizing a start or a start-up of the technical facility can take place only when the derived master key is found to be satisfactory.

2. The method according to claim 1, further comprising:
during a boot operation of the set of controls, initially setting the set of controls to a pre-operational state in which with the aid of a security module, a token is generated based on data and features that include the characteristics and/or environmental data and/or input parameters of the set of controls,
transmitting the tokens of all sets of controls installed in the facility to a decision module,
generating the master key in the decision module based on the tokens, with the aid of an algorithm,
supplying the master key to the sets of controls,
decrypting, by the master key, the encrypted region of the sets of controls, and
responsive to the decrypting of the encrypted region, switching the sets of controls from the pre-operational state into the operating state, as the result of which the technical facility starts operating.

3. The method according to claim 2, wherein the transmission of the tokens takes place in an encrypted manner.

4. The method according to claim 2, wherein the tokens are cryptographically checked for integrity and origin in order to ensure that the particular tokens also unequivocally originate from an authorized set of controls in the environment.

5. The method according to claim 1, wherein the method is used in a technical facility in the form of a wind turbine.

6. The method according to claim 1, wherein the master key is not stored on any of the sets of controls.

7. The method according to claim 1, wherein the step of deriving the master key comprises:
generating a token for each set of controls based on data and features that include the characteristics and/or environmental data and/or input parameters of each set of controls, and
generating the master key based on the tokens.

8. A method for checking the integrity of modules of a technical facility, wherein the technical facility has multiple modules and sets of controls for controlling the technical facility, wherein for starting up each set of controls and the overall technical facility, a master key is used which is utilized for decrypting an encrypted region of the set of controls,
characterized in that the master key for starting up a set of controls of the technical facility is derived from features of all sets of controls installed in the technical facility, wherein a start or a start-up of the technical facility can take place only when the master key is found to be satisfactory,
wherein during a boot operation of the set of controls, the set of controls initially assumes a pre-operational state in which with the aid of a security module, a token is generated based on data and features that include the characteristics and/or environmental data and/or input parameters of the set of controls,
wherein the tokens of all sets of controls installed in the facility are transmitted to a decision module,
wherein the master key is generated in the decision module based on the tokens, with the aid of an algorithm,
wherein the master key is supplied to the sets of controls, and by the master key, the encrypted region of the sets of controls is enabled, and
the sets of controls switch from the pre-operational state into the operating state, as the result of which the start-up of the technical facility can take place.

\* \* \* \* \*